United States Patent [19]

Clark

[11] 4,262,640
[45] Apr. 21, 1981

[54] SPRING RETAINER-VALVE SELECTOR

[75] Inventor: David P. Clark, Battle Creek, Mich.

[73] Assignee: Eaton Corporation, Cleveland, Ohio

[21] Appl. No.: 897,833

[22] Filed: Apr. 19, 1978

[51] Int. Cl.³ .............................................. F02D 13/06
[52] U.S. Cl. .............................. 123/198 F; 123/90.16; 123/90.43
[58] Field of Search .............. 123/198 F, 90.15, 90.16, 123/90.17, 90.43, 90.47, 90.65, 90.67

[56] References Cited

U.S. PATENT DOCUMENTS

| 2,142,224 | 1/1939 | Turlay | 123/90.65 |
| 2,842,111 | 7/1958 | Braun | 123/90.67 |
| 3,021,593 | 2/1962 | Cousino | 123/90.67 |
| 3,114,361 | 12/1963 | Mullen | 123/90.67 |

FOREIGN PATENT DOCUMENTS 2621794 11/1976 Fed. Rep. of Germany ....... 123/198 F

Primary Examiner—Ira S. Lazarus
Attorney, Agent, or Firm—R. J. McCloskey; E. C. Crist; R. A. Johnston

[57] ABSTRACT

A valve selector including a telescoping spring capsule subassembly having a dual retainer ring arrangement for limiting the maximum extended length thereof. A cup-shaped spring retaining member has an internal groove formed near its rim and a cup-shaped spring receiving member has an external groove formed near its outer open end. The spring retaining member is partially received over the spring receiving member with the external groove axially aligned over the internal groove. A compression spring is captured between the opposed bottom surfaces of the retainer members. An inner retaining ring is received in the external groove and an outer retaining ring is received in the internal groove. The outer ring has an internal diameter sized less than the outer diameter of the inner retaining ring for providing a radial overlap condition. The maximum spacing of the spring receiving and spring retaining members is limited by abutment of adjacent axial faces of the inner and outer retaining rings.

5 Claims, 4 Drawing Figures

U.S. Patent    Apr. 21, 1981    4,262,640
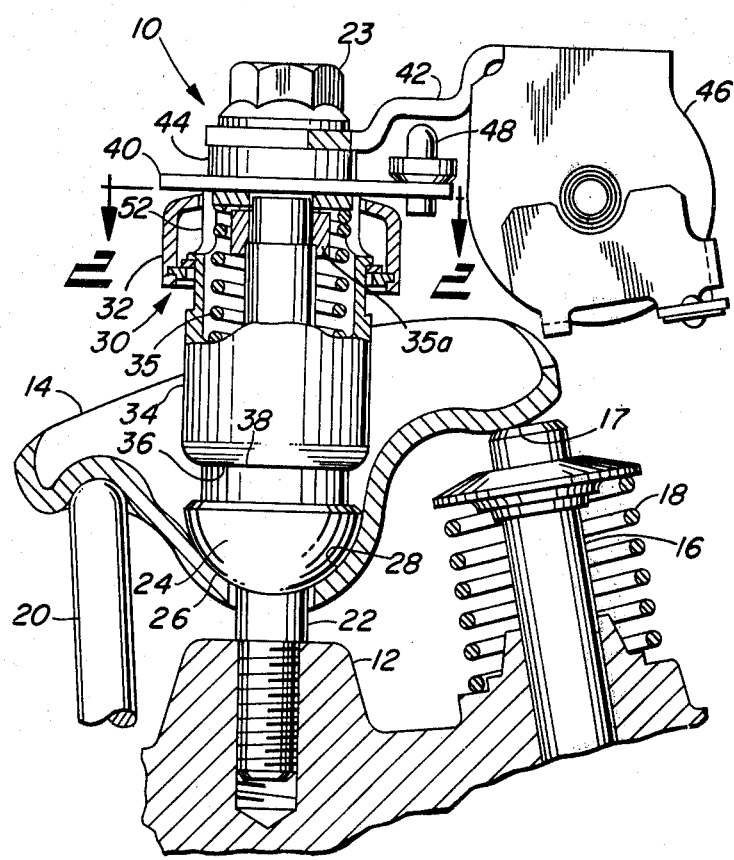
_Fig. 1_
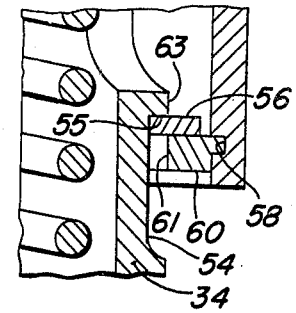
_Fig. 3_
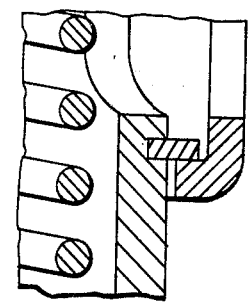
_Fig. 4_
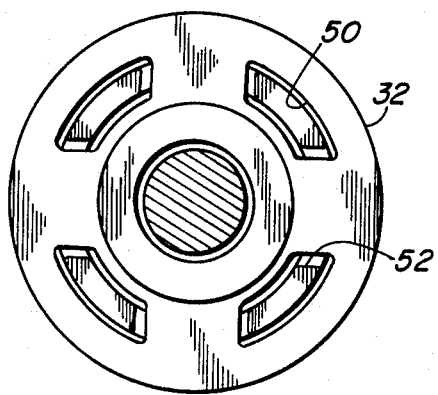
_Fig. 2_

SPRING RETAINER-VALVE SELECTOR

FIELD OF THE INVENTION

This invention relates to an improved device for selectively enabling and disabling engine valves while the engine is running, and includes a unique subassembly therefor including an arrangement for limiting the expansion of a compression spring capsule between upper and lower retainer members forming a spring capsule subassembly.

DESCRIPTION OF THE PRIOR ART

A known arrangement for a portion of a valve selector assembly is illustrated in FIG. 4. Such an arrangement is described in copending U.S. patent application of Martin W. Uitvlugt entitled "Valve Disabler and Control," Ser. No. 627,424 filed Oct. 30, 1975, and assigned to the assignee of the present invention. The arrangement of FIG. 4 illustrates portions of the assembled spring retaining cup and spring receiving cup and utilizes a single retainer ring to limit the outward movement of the cups relative to each other. The ring is sested in an external annular groove formed in the spring receiving cup and abuts against an inwardly extending flange located around the end of the cup-shaped spring retaining member. This type of arrangement is extremely difficult to assemble and requires a retaining ring spreader tool be inserted through openings in the spring retainer member to slide and spread the retaining ring into position over the ring groove. The difficulty of the assembly procedure is compounded by having to compress the compression spring with a force of approximately 85 pounds while it is captured between the ends of the retainer members. Further difficulty associated with the prior art arrangement has been encountered in visually determining whether the retaining ring was properly seated in its groove due to its relatively hidden position. Another shortcoming associated with the previous assembly arrangement has been its lack of adaptability to automatic assembly methods. The application of automatic assembly equipment to the prior structure would have been unduly complicated and costly in view of the following required assembly procedure: first, holding the ring open with a spreader tool inserted through the opening in the spring retainer member; then inserting the spring receiving member into the spring retainer member and through the spread retaining ring; then, releasing the tool holding the ring open and withdrawing the tool through the openings in the spring retainer member; then locating the spring receiving member to permit fingers extending from the open end thereof to extend through aligned openings in the spring retainer member; and finally, inserting a tool through side openings in the spring retainer member and sliding the retaining ring into the retaining groove in the spring receiving member. As can be appreciated from the foregoing procedure, a substantial amount of the assembly work must be performed by hand.

SUMMARY OF THE INVENTION

In the present invention a unique device for selectively enabling and disabling engine valves is provided, wherein a telescoping capsule subassembly is employed having a compression spring captured therein and having a dual retainer ring arrangement provided for limiting the maximum height attainable by the compressible spring capsule subassembly. The spring capsule subassembly is comprised of an upper, spring retainer member which has received therein in telescoping arrangement a lower, spring receiving member. An inner retaining ring is positioned over the spring receiving member and is seated in an external groove. A corresponding outer retaining ring is mounted in an internal groove formed in the spring retaining member. The present invention permits easy assembly of the device by permitting the retaining rings to be positioned in their respective grooves from a location exteriorly of the compression spring capsule. The present invention thus provides a unique structure which can be assembled in a manner which eliminates the need for time consuming and difficult maneuvering of tools through relatively small openings in the spring retaining member in order to spread the retaining ring over the body of the spring receiving member as was required in assembling previously known devices of this type.

The present invention improves reliability of the device by permitting visual inspection after assembly to determine whether or not the rings are properly seated in their respective mounting grooves.

A further feature of the invention is the increased ability of the dual ring arrangement to resist the forces imposed by retaining the compression spring afforded by greater area of contact of the abutting surfaces provided by the overlapping ring arrangement.

BRIEF DESCRIPTION OF THE DRAWINGS

FIG. 1 is a side elevational view in partial cross section showing the device of the present invention installed in overhead valve gear of an engine;

FIG. 2 is a section view taken along section indicating lines 2—2 of FIG. 1 illustrating the telescoping fingers of the rotary latch mechanism for enabling and disabling valve movement;

FIG. 3 is an enlarged view of the dual retaining ring arrangement taken from FIG. 1; and FIG. 4 is a view similar to FIG. 3 illustrating a prior art retaining arrangement.

DETAILED DESCRIPTION OF THE DRAWINGS

Referring now to FIG. 1, there is shown generally by reference numeral 10 a valve selector assembly mounted on a cylinder head 12 of an engine having overhead valve gear for selectively enabling and disabling engine valves. Portions of a pushrod type internal combustion engine valve train assembly are illustrated and include a rocker arm 14, a poppet valve stem 16 in contact with the rocker arm at 17, a spring 18 biasing the poppet valve to a closed position, and a pushrod 20 which actuates the poppet valve to an open position by a lobe of a camshaft (not shown) acting through a hydraulic tappet, not shown. The invention as illustrated is employed in a particular style valve gear; however, it will be understood by those skilled in the art that such devices may also be employed in engines having other valve gear arrangements as, for example, an overhead cam valve gear system, and the particular valve gear arrangement forms no part of the present invention.

A threaded stud 22 is mounted in the engine block and positions the valve selector assembly 10 over the rocker arm 14. A retaining nut 23 is received over the upper end of stud 22 for securing the valve selector assembly to stud 22. The valve selector assembly 10 includes a fulcrum member 24 slidably received over stud 22 and has a lower external spherical fulcrum surface 26 engageable with a corresponding internal spherical pivot surface 28 formed on rocker arm 14. A selectively latchable, telescoping compression spring capsule 30 is provided and includes an upper, cup-shaped spring retaining member 32, a lower-cup-shaped spring receiving member 34, a compression spring 35 received therebetween, and a spring guide 35a preferably in the form of a spacer ring received over the threaded portion of stud 22. A flat transverse surface 36 is formed on the closed lower end of spring receiving member 34 and the surface 36 engages a corresponding transverse flat surface 38 defined by the upper end of fulcrum member 24. A rotatable latch plate 40 is located immediately above spring capsule 30 and is in contact therewith on the closed face of the cup shaped retaining member 32. A bridge plate 42 is provided and has a portion thereof received over stud 22 and is axially captured between a washer 44 and the lower surface of retaining nut 23. A solenoid actuator 46 is mounted on bridge plate 42 and is thus positioned for operative connection to the device. A linkage assembly 48 operatively connects the latch plate 40 with the movable armature (not shown) solenoid actuator 46.

Referring now to FIG. 2, spring retaining member 32 is illustrated in plan view and includes four circumferentially, preferably equally spaced arcuate openings 50. Four corresponding circumferentially spaced fingers 52 are formed on the upper end of spring receiving member 34 and are receivable in the arcuate openings 50. Latch plate 40 includes four circumferentially spaced arcuate openings, not shown, which are configured and sized identically with openings 50.

A detailed description of the basic structural and operational characteristics of linkage assembly 48, solenoid actuator 46, and latch plate 40 can be had by referring to copending U.S. patent applications of Martin W. Uitvlugt, Ser. No. 627,424 filed Oct. 30, 1975 entitled "Valve Disabler Control," and Ser. No. 671,760 filed Mar. 30, 1976 entitled "Improved Valve Disabler," both assigned to the assignee of the present invention.

Referring now to FIG. 3, an external annular groove 54 is formed into the external cylindrical surface of spring receiving member 34 and groove 54 preferably has the width thereof substantially greater than its depth. An inner retaining ring 56 is received in groove 54. An internal annular groove 58 is formed into the internal cylindrical surface of spring retaining member 32 and is positioned closely adjacent to the open end thereof. An outer retaining ring 60 is received and located in groove 58. Inner and outer retaining rings 56 and 60 are conventionally designed split rings fabricated from a suitable tempered spring steel. Outer ring 60 is preferably "L" shaped in cross section and has an axial thickness at its internal diameter substantially greater than the axial thickness at its outer diameter in order to achieve added rigidity. A unique structural aspect of the capsule of the present invention is the retaining ring mounting arrangement in which the internal diameter 61 of outer ring 60 is sized to be substantially the same as the outer diameter 63 of the upper shoulder 55 of groove 54 for minimizing torsion of ring 56 by the loading applied thereto from outer ring 60. This overlapping ring feature tends to limit "oil canning" of inner ring 56, thereby increasing the load carrying capacity of the assembly.

The dual retaining ring arrangement of the capsule subassembly of the present invention permits the capsule subassembly to be easily assembled by first sliding inner ring 56 over the bottom or closed portion of spring receiving member 34 and into external annular groove 54 until it abuts the upper shoulder 55 of the groove 54. The spring retaining member 32 is first aligned over spring receiving member 34 to receive each of the fingers 52 in one of the openings 50 and is then telescoped thereover with the compression spring 16 captured therebetween. The spring retaining member 32 is then positioned downwardly in FIG. 1 with respect to member 34 thereby compressing spring 35, until internal annular groove 58 is positioned below the inner retaining ring 56 and aligned over external groove 54. The outer retaining ring 60 is then slipped over the end of spring receiving member 34 and compressed radially inward toward the diameter of groove 54 until it can be aligned axially with groove 58 and it is then released and permitted to expand radially outward into groove 58. It will be apparent from FIG. 3 that the width of groove 54 is preferably sized to provide ample room for outer retaining ring 60 to be compressed and slipped into position for insertion into groove 58.

In operation of the device 10, to effect valve disabling, the latch plate 40 is rotated only when the cyclic forces on pushrod 20 are relaxed by solenoid actuator 46 acting through linkage assembly 48 to a position in which the openings therein (not shown) are aligned over the openings 50, thus permitting the fingers 52 of spring receiving member 34 to move upwardly therein upon upward movement of rocker arm 14 urging by pushrod 20. The lost motion type movement or telescoping of spring receiving member 34 toward spring retaining member 32 permits fulcrum member 24 to rise a predetermined amount resulting in rocker arm 14 pivoting about a fulcrum center defined by the valve stem-rocker arm contact point 17. Pivoting occurs about point 17 rather than spherical fulcrum surface 26 due to the fact that the spring rate of compression spring 35 is chosen to permit compression thereof without accompanying deflection of valve biasing spring 18, with the result being disabling of the valve. Enabling of the valve is achieved while pushrod 20 is at its lowest position with the hydraulic tappet riding on the base circle portion of the cam lobe by de-energizing solenoid actuator 46. While the pushrod is in this lowest position, compression spring 35 urges the spring receiving member 34 downward with respect to the spring retaining member 32 so that inner ring 56 abuts against outer ring 60. The fingers 52 are now withdrawn from the openings in the latch plate, whereupon a return spring, not shown, associated with the solenoid actuator, rotates the latch plate 40 to a position blocking re-entry of the fingers 52 therein and maintaining the fulcrum member 24 in the position illustrated in FIG. 1. In the "valve enabling" mode or position the location of the fulcrum center is generally the axial length of spring capsule 30 with the ends of fingers 52 contacting the undersurface of latch plate 40.

The embodiment of the invention as shown and described above is representative of the inventive principles stated therein. It is to be understood that variations and departures can be made from this embodiment as shown without, however, departing from the scope of the appended claims.

What is claimed is:

1. A device for selectively enabling and disabling a combustion chamber poppet valve in an internal combusiton engine, said engine having valve gear of the type including a pivotable rocker arm having a first pivot surface thereon operatively connected to said valve for transmitting cyclically applied forces thereto for effecting opening and closing of the valve, said device comprising:
(a) mounting means fixed to said engine;
(b) fulcrum means including means defining a second pivot surface, said fulcrum means slidably received over said mounting means and engageable with said rocker arm at said first pivot surface, said fulcrum means having a first position in which said rocker arm pivots about said second surface, said valve gear being in an enable condition when said fulcrum means is in said first position;
(c) means for selectively locking and releasing said fulcrum means from said first position such that, upon release of said fulcrum means from said first position and upon subsequent application of said cyclically applied forces to said rocker arm, said rocker arm pivots about a second pivot surfaced defined by a contact point between said valve and said rocker arm, said rocker arm upon pivoting about said second pivot surface being not effective for movement of said valve, said locking and releasing means including,
(i) telescoping capsule means received on said mounting means and in contact with said fulcrum means, said capsule means including an upper cup-shaped spring retainer member in a substantially axially fixed position with respect to said mounting means, a lower spring receiving means including cup-shaped spring receiving member partially received within and adapted for lost motion with respect to said spring retainer member, spring means received between said spring receiving member and said spring retainer member, said spring means biasing said receiving and retaining members away from each other, radially compressible means received in said spring retainer and exerting a radially outward bias, means associated with said spring receiving means and defining a radially inner abutment surface, said radially compressible means radially overlapping said radially inner abutment surface for limiting the longitudinal movement of said spring retaining member with respect to said spring receiving member, as urged apart by said spring means, said inner abutment surface and said radially compressible means otherwise permitting lost motion of said spring receiving member toward said spring retaining member,
(ii) blocking means receiving on said mounting means and contacting said capsule means, said blocking means being movable between a first position in which motion of said spring receiving member relative to said spring retaining member is prevented and said rocker is thereby maintained in said first position, and a second position for said blocking means in which relative motion of said spring receiving member with respect to said spring retaining member is permitted during which said spring capsule means absorbs through lost motion the cyclically applied forces of said valve gear train for disabling said valve, and
(iii) actuating means connected to said blocking means and operative for selectively moving said blocking means between said first and second positions, wherein upon movement of said blocking means to said first position during relaxation of said cyclic forces said fulcrum means is thereafter maintained in said first position for enabling said valve, and wherein upon subsequent movement of said blocking means to said second position during relaxation of said cyclic forces said rocker arm pivots about said second surface for disabling said valve movement.

2. The device as defined in claim 1, wherein
(a) said inner abutment surface is defined by a first annular, radially split, ring received in said spring receiving member; and
(b) said radially compressible means comprises a second annular, radially split ring.

3. The device as defined in claim 2, wherein said second annular ring has a transverse thickness at the internal diameter thereof substantially thicker than the transverse thickness at the outer diameter thereof.

4. The device as defined in claim 2, wherein
(a) said spring retaining member having an internal annular groove formed on the inner periphery and located near the open end thereof, said second annular ring received therein;
(b) said spring receiving member having an external annular groove formed on the outer periphery and located near the open end thereof, said first annular ring received therein;
(c) said first annular ring has an internal diameter sized in closely fitting relationship to the diameter of said external groove; and
(d) said second annular ring has an internal diameter sized in loosely spaced relationship to the external diameter of the shoulder of said external groove nearest the opening of said spring receiving member.

5. A device for selectively enabling and disabling a combustion chamber poppet valve in an internal combusiton engine, said engine having valve gear of the type including a pivotable rocker arm having a first pivot surface thereon operatively connected to said valve for transmitting cyclically applied forces thereto for effecting opening and closing of the valve, said device comprising:
(a) mounting means fixed to said engine;
(b) fulcrum means including means defining a second pivot surface, said fulcrum means slidably received over said mounting means and engageable with said rocker arm at said first pivot surface, said fulcrum means having a first position in which said rocker arm pivots about said second surface, said valve gear being in an enable condition when said fulcrum means is in said first position;
(c) means for selectively locking and releasing said fulcrum means from said first position such that, upon release of said fulcrum means from said first position and upon subsequent application of said cyclically applied forces to said rocker arm, said rocker arm pivots about a second pivot surfaced defined by a contact point between said valve and said rocker arm, said rocker arm upon pivoting about said second pivot surface being not effective for movement of said valve, said locking and releasing means including, (i) telescoping capsule means received on said mounting means and in contact with said fulcrum means, said capsule means including an upper cup-shaped spring retainer member in a substantially axially fixed position with respect to said mounting means, a lower spring receiving means including a cup-shaped spring receiving member partially received within and adapted for lost motion with respect to said spring retainer member, spring means received between said spring receiving member and said spring retainer member, said spring means biasing said receiving and retaining members away from each other, outer radially compressible means received in said spring retainer and exerting a radially outward bias, inner radially compressible means received in said spring receiving means and exerting a radially inward bias, said inner radially compressible means radially overlapping said outer radially compressible means for limiting the longitudinal movement of said spring retaining member with respect to said spring receiving member, as urged apart by said spring means, said inner and said outer radially compressible means otherwise permitting lost motion of said spring receiving member toward said spring retaining member, (ii) blocking means receiving on said mounting means and contacting said capsule means, said blocking means being movable between a first position in which motion is said spring receiving member relative to said spring retaining member is prevented and said rocker is thereby maintained in said first position, and a second position for said blocking means in which relative motion of said spring receiving member with respect to said spring retaining member is permitted during which said spring capsule means absorbs through lost motion the cyclically applied forces of said valve gear train for disabling said valve, and (iii) actuating means connected to said blocking means and operative for selectively moving said blocking means between said first and second positions, wherein upon movement of said blocking means to said first position during relaxation of said cyclic forces said fulcrum means is thereafter maintained in said first position for enabling said valve, and wherein upon subsequent movement of said blocking means to said second position during relaxation of said cyclic forces said rocker arm pivots about said second surface for disabling said valve movement.

* * * * *